(12) United States Patent
Jo et al.

(10) Patent No.: US 9,049,739 B2
(45) Date of Patent: Jun. 2, 2015

(54) APPARATUS FOR TRANSMITTING A SIGNAL USING SCHEDULING INFORMATION IN A MOBILE COMMUNICATION SYSTEM AND METHOD FOR SAME

(75) Inventors: Jun Ho Jo, Anyang-si (KR); Han Byul Seo, Anyang-si (KR); Ji Hyun Lee, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 13/380,497

(22) PCT Filed: Jun. 23, 2010

(86) PCT No.: PCT/KR2010/004057
§ 371 (c)(1),
(2), (4) Date: Dec. 22, 2011

(87) PCT Pub. No.: WO2010/151035
PCT Pub. Date: Dec. 29, 2010

(65) Prior Publication Data
US 2012/0108255 A1 May 3, 2012

Related U.S. Application Data

(60) Provisional application No. 61/320,296, filed on Apr. 1, 2010, provisional application No. 61/219,387, filed on Jun. 23, 2009.

(30) Foreign Application Priority Data

Dec. 1, 2009 (KR) ................ PCT/KR2009/007104

(51) Int. Cl.
*H04W 74/00* (2009.01)
*H04W 72/00* (2009.01)
(Continued)

(52) U.S. Cl.
CPC ........ *H04W 72/1263* (2013.01); *H04W 84/045* (2013.01); *H04W 48/08* (2013.01); *H04W 16/32* (2013.01); *H04W 72/1289* (2013.01); *H04W 92/20* (2013.01)

(58) Field of Classification Search
USPC ......... 455/62, 450, 452.2, 455; 370/252, 312, 370/329
See application file for complete search history.

(56) References Cited

U.S. PATENT DOCUMENTS 8,320,319 B2 * 11/2012 Lohr et al. .................... 370/329
2004/0203831 A1 10/2004 Khan
(Continued)

FOREIGN PATENT DOCUMENTS

| KR | 1020080040655 | 5/2008 |
| KR | 1020090008055 | 1/2009 |
| KR | 100883268 | 2/2009 |

OTHER PUBLICATIONS

United States Patent and Trademark Office U.S. Appl. No. 12/820,093, Final Office Action dated Jan. 7, 2013, 26 pages.
(Continued)

*Primary Examiner* — Inder Mehra
(74) *Attorney, Agent, or Firm* — Lee, Hong, Degerman, Kang & Waimey

(57) ABSTRACT

Disclosed are a method for transmitting scheduling information in a mobile communication system and a femtocell base station using the method. A femtocell base station transmits scheduling information using a layered scheduling system in which the femtocell base station receives an allocated resource from a macrocell base station, and allocates the resource to femtocell users within a resource region thereof.

14 Claims, 16 Drawing Sheets

(51) Int. Cl.
*H04W 36/00* (2009.01)
*H04B 15/00* (2006.01)
*H04J 1/00* (2006.01)
*H04J 1/16* (2006.01)
*H04W 84/04* (2009.01)
*H04W 48/08* (2009.01)
*H04W 16/32* (2009.01)
*H04W 72/12* (2009.01)
*H04W 92/20* (2009.01)

(56) References Cited

U.S. PATENT DOCUMENTS

| | | |
|---|---|---|
| 2005/0281247 A1 | 12/2005 | Lim et al. |
| 2007/0115878 A1* | 5/2007 | Ashish et al. ................. 370/329 |
| 2008/0076425 A1 | 3/2008 | Khetawat et al. |
| 2009/0040972 A1 | 2/2009 | Robson et al. |
| 2009/0098871 A1 | 4/2009 | Gogic |
| 2009/0109922 A1 | 4/2009 | Livanos |
| 2009/0117901 A1 | 5/2009 | Zhao et al. |
| 2009/0163221 A1 | 6/2009 | Abedi |
| 2009/0191813 A1 | 7/2009 | Abedi |
| 2009/0191888 A1* | 7/2009 | Abedi ........................... 455/450 |
| 2009/0209199 A1 | 8/2009 | Suga |
| 2009/0252079 A1 | 10/2009 | Zhang et al. |
| 2009/0270107 A1 | 10/2009 | Lee et al. |
| 2009/0303918 A1 | 12/2009 | Ma et al. |
| 2010/0111021 A1* | 5/2010 | Hui ............................... 370/329 |
| 2010/0136989 A1 | 6/2010 | Westerberg et al. |
| 2010/0157820 A1* | 6/2010 | Cheng et al. .................. 370/252 |
| 2010/0322180 A1* | 12/2010 | Kim et al. ..................... 370/329 |
| 2011/0205954 A1* | 8/2011 | Gorokhov et al. ............ 370/315 |
| 2011/0216676 A1* | 9/2011 | Li et al. ......................... 370/281 |
| 2011/0223923 A1 | 9/2011 | Cho et al. |

OTHER PUBLICATIONS

United States Patent and Trademark Office U.S. Appl. No. 12/820,093, Office Action dated Apr. 25, 2014, 25 pages.

* cited by examiner

Macro PDCCH of the corresponding frame is
also transmitted at the same time.

APPARATUS FOR TRANSMITTING A SIGNAL USING SCHEDULING INFORMATION IN A MOBILE COMMUNICATION SYSTEM AND METHOD FOR SAME

This application is the National Stage filing under 35 U.S.C. 371 of International Application No. PCT/KR2010/004057, filed on Jun. 23, 2010, which claims the benefit of earlier filing date and right of priority to International Application No. PCT/KR2009/007104, filed on Dec. 1, 2009, and also claims the benefit of U.S. Provisional Application Ser. Nos. 61/320,296, filed on Apr. 1, 2010, and 61/219,387, filed on Jun. 23, 2009, the contents of all of which are incorporated by reference herein in their entireties.

FIELD OF THE INVENTION

The present invention relates to a method for transmitting scheduling information and, more particularly, to an apparatus for transmitting scheduling information in a hierarchical cell structure and a method for the same.

BACKGROUND ART

A femtocell base station corresponds to a type of base station, which corresponds to a small sized version of a macrocell base station that can perform most of the functions of the macrocell base station, and which may be installed in a cover area of the macrocell base station or in a shadow area that cannot be covered by the macrocell base station. The femtocell base station is equipped with a network configuration that can be independently operated. And, as compared to relay base stations, a remarkably larger number of femtocell base stations may be installed in downtown areas or indoor areas. Therefore, due to the large amount of information, a list of femtocell base stations is not included in a list of neighboring base stations, which is transmitted to the user equipment by the base station.

FIG. 1 corresponds to a structural view of a wireless communication system additionally including a femtocell base station.

As shown in FIG. 1, the wireless communication system additionally including a femtocell base station includes a femtocell base station (110), a macrocell base station (120), a femto network gateway (hereinafter referred to as "FNG") (130), an access service network (hereinafter referred to as "ASN") (140), and a connectivity service network (hereinafter referred to as "CSN") (150). Herein, the macrocell base station (120) refers to a general base station that is included in the related art wireless communication system.

As a small sized version of the macrocell base station (120), the femtocell base station (110) performs most of the functions of the macrocell base station. The femtocell base station (110) directly accesses a TCP/IP (transmission control protocol/internet protocol) network and operates independently, just as the macrocell base station (120). Herein, the coverage of the femtocell base station (110) is within range of approximately 0.1~30 m. And, one femtocell base station (110) may accommodate about 10~20 user equipments. Herein, the femtocell base station (110) may either use the same frequency as that of the macrocell base station (120) or use a different frequency.

The femtocell base station (110) is connected to the macrocell base station (120) through an R1 interface, thereby being capable of receiving a downlink channel of the macrocell base station (120). And, the femtocell base station (110) may transmit a control signal to the macrocell base station (120).

The femtocell base station (110) is capable of covering indoor or shadow areas that cannot be covered by the macrocell base station (120) and may also support a high data transmission rate. The femtocell base station (110) may be installed within the macrocell in a overlay format, or the femtocell base station (110) may also be installed in a non-overlay format in an area that cannot be covered by the macrocell base station (120).

The femtocell base station (110) may be divided into two different types. A first type corresponds to a CSG (closed subscriber group) femtocell base station, and a second type corresponds to an OSG (open subscriber group) femtocell base station. The CSG femtocell base station groups user equipments that can access the CSG femtocell base station and assigns CSG ID (identification) to the accessing user equipments. Thereafter, only the user equipments that are assigned with a CSG ID can access the CSG femtocell base station. The OSG femtocell base station corresponds to a base station that allows the access of all user equipments.

The FNG (130) is a gateway that is configured to control the femtocell base station (110). Herein, the FNG (130) is respectively connected to the ASN (140) and the CSN (150) through an Rx interface and an Ry interface. The femtocell base station (110) may receive service from the CSN (150) through the FNG (130), and the user equipments that are connected to the femtocell base station (110) may be serviced with functions, such as certification, IMS, and so on, from the FNG (130) or the CSN (150).

The CSN (150) provides the user equipments with connections to application services, such as the internet, VoIP, and so on, and also provides the user equipment with certification (or authentication) and charging functions. And, the ASN (140) controls the macrocell base station (120) and manages the connection between the macrocell base station (120) and the CSN (150).

FIG. 2 illustrates an exemplary scheduling method of a related art macrocell base station.

The scheduling method shown in FIG. 2 corresponds to a case where a conventional macro based scheduling method is extended to a hierarchical cell structure. The conventional method corresponds to a method wherein the macrocell base station receives feedback information (e.g., channel information, traffic information) from macro users and authorizes communication through a specific frequency at a specific timing. Accordingly, when this method is extended and applied to a hierarchical cell structure, the macrocell base may receive all necessary information from the femto users and the macro users. At this point, the femto user may include a parameter respective to its relation with the femtocell base station in the feedback, rather than a parameter respective to its relation with the macrocell base station, and transmit the feedback information including the parameter respective to the relation between the femto user and the femtocell base station. After receiving the feedback information from the femto users and the macro users, the macrocell base station may allocate resource to each user. The macrocell base station may differentiate the macro users from the femto users and may operate accordingly.

Herein, in case of the macro users, the necessary information may follow the conventional method. And, in case of the femto users, the necessary information may be fed-back to the macrocell base station by using the conventional method, or the femtocell base station may gather information on the femto user and may feed-back the gathered information instead of the femto user. At this point, when the macrocell base station allocates femto user resources, this indicates that the femto user is authorized to perform communication with the femtocell base station by using the corresponding resource.

FIG. 3 illustrates a frame structure used by the related art macrocell base station for transmitting scheduling information.

The macrocell base station may transmit scheduling information to the macro users and the femto users in subframe units by using a macro PDCCH section. The related art scheduling method is disadvantageous in that the femtocell base station operates manually and performs operations similar to those of a relay station, and that free scheduling cannot be performed. Furthermore, the related art scheduling method is also disadvantageous in that a scheduling overhead of the macrocell base station is considerably high, and also that user equipments having poor reception from the macrocell base station cannot receive any scheduling information.

DETAILED DESCRIPTION OF THE INVENTION

Technical Objects

The technical object which the present invention seeks to achieve is to provide a method for transmitting scheduling information performed by a femtocell base station in a mobile communication system.

Another technical object of the present invention is to provide a femtocell base station device for transmitting scheduling information in a mobile communication system.

Another technical object of the present invention is to provide a method for transmitting scheduling information performed by a macrocell base station in a mobile communication system.

A further technical object of the present invention is to provide a macrocell base station transmitting scheduling information in a mobile communication system.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical objects of the present invention, a method for transmitting scheduling information according to the present invention includes the steps of receiving scheduling information from a macrocell base station in $N^{th}$ time unit (wherein N is an integer), the scheduling information including information on resource allocation for the femtocell base station, and transmitting a signal to at least one or more femtocell user equipments in one or more time units starting from a $N+K^{th}$ time unit (wherein K is an integer), the femtocell user equipments being serviced by the femtocell base station.

The method may further include the step of transmitting the scheduling information received from the macrocell base station to the at least one or more femtocell user equipments in $N+M^{th}$ time unit (wherein M is an integer, and wherein $1 \leq M \leq K$).

And, the method may further include the step of transmitting a signal requesting resource allocation to the macrocell base station.

In order to achieve the technical objects of the present invention, a femtocell base station for transmitting a signal by using scheduling information according to the present invention includes a reception module configured to receive scheduling information from a macrocell base station in a $N^{th}$ time unit (wherein N is an integer), the scheduling information including information on resource allocation for the femtocell base station, a scheduling module configured to perform scheduling on at least one or more femtocell user equipments in one or more time units starting from a $N+K^{th}$ time unit (wherein K is an integer), by using the received scheduling information, the femtocell user equipments being serviced by the femtocell base station, and a transmission module configured to transmit a signal to the at least one or more femtocell user equipments in one or more time units starting from the $N+K^{th}$ time unit (wherein K is an integer).

Herein, the femtocell base station may further include a transmission module configured to transmit the scheduling information received from the macrocell base station to the at least one or more femtocell user equipments in $N+M^{th}$ time unit (wherein M is an integer, and wherein $1 \leq M \leq K$). And, the femtocell base station may further include a transmission module configured to transmit a signal requesting resource allocation to the macrocell base station.

In order to achieve other technical objects of the present invention, a method of performing scheduling at a macrocell base station in a mobile communication system includes the steps of transmitting scheduling information to a femtocell base station in a $N^{th}$ time unit (wherein N is an integer), the scheduling information including information on resource allocated to the femtocell base station, and, performing scheduling on one or more user equipments being serviced by the macrocell base station with the exception for user equipments being serviced by the femtocell base station in one or more time units allocated to the femtocell base station starting from a $N+K^{th}$ time unit (wherein K is an integer).

In order to achieve further technical objects of the present invention, a macrocell base station for performing scheduling according to the present invention includes a transmission module configured to transmit scheduling information to a femtocell base station in a $N^{th}$ time unit (wherein N is an integer), the scheduling information including information on resource allocated to the femtocell base station, and, a scheduling module configured to perform scheduling on one or more user equipments being serviced by the macrocell base station with the exception for user equipments being serviced by the femtocell base station in one or more time units allocated to the femtocell base station starting from a $N+K^{th}$ time unit (wherein K is an integer).

Effects of the Invention

According to the present invention, in a mobile communication system having a hierarchical cell structure, when different types of networks co-exist by using the same frequency domain, resource allocation may be dynamically performed by reflecting the demands of the users belonging to each network.

According to the present invention, hierarchical radio resource scheduling may be efficiently realized while minimizing the change in the conventional system. Also, according to the present invention, the radio resource allocated to the femtocell base station may use a characteristic that is used within the corresponding femtocell, so as to realize communication between the user equipment included in the femtocell. And, herein, Spatial Reuse may also be realized.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

Figure 1:
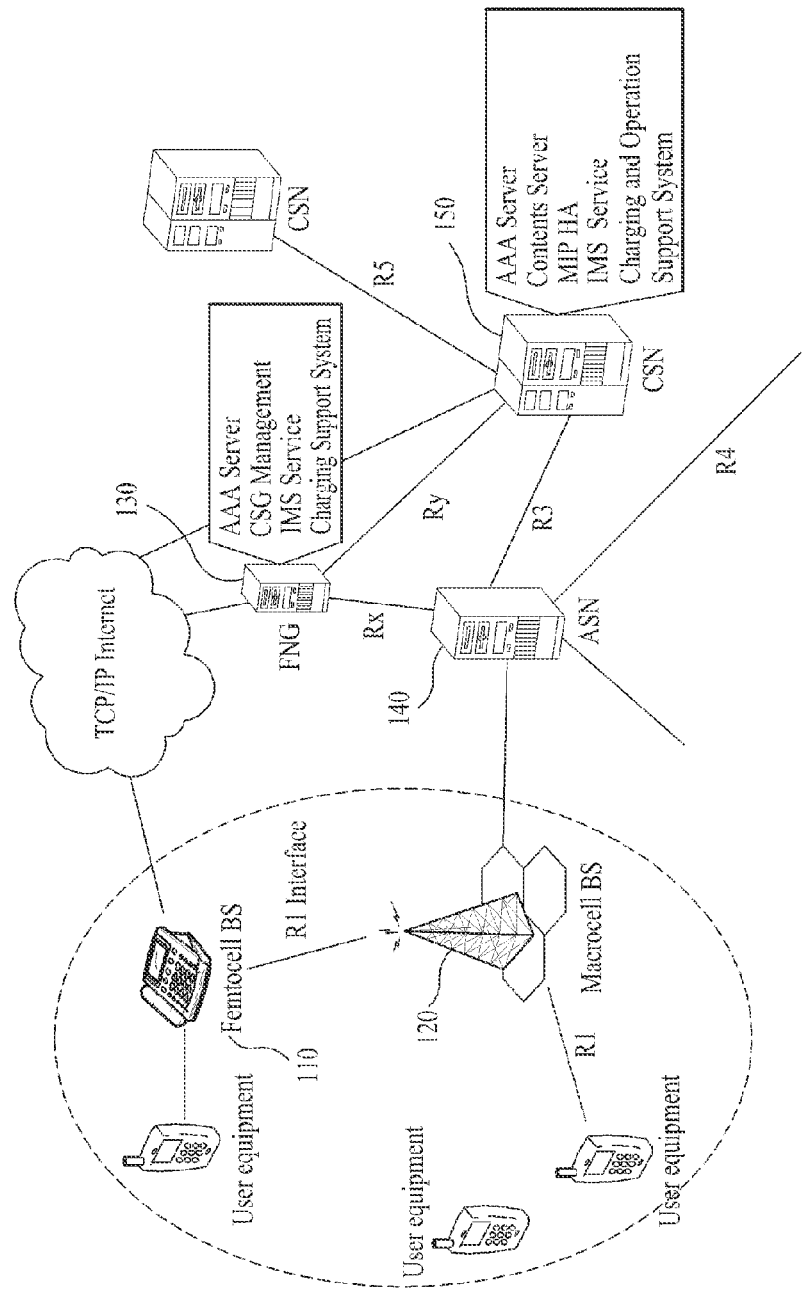
FIG. 1 illustrates physical channels used by a 3GPP (3rd Generation Partnership Project) LTE (Long Term Evolution) system, the 3GPP LTE system being an example of a mobile communication system, and a general method for transmitting signals by using such physical channels.
Figure 2:
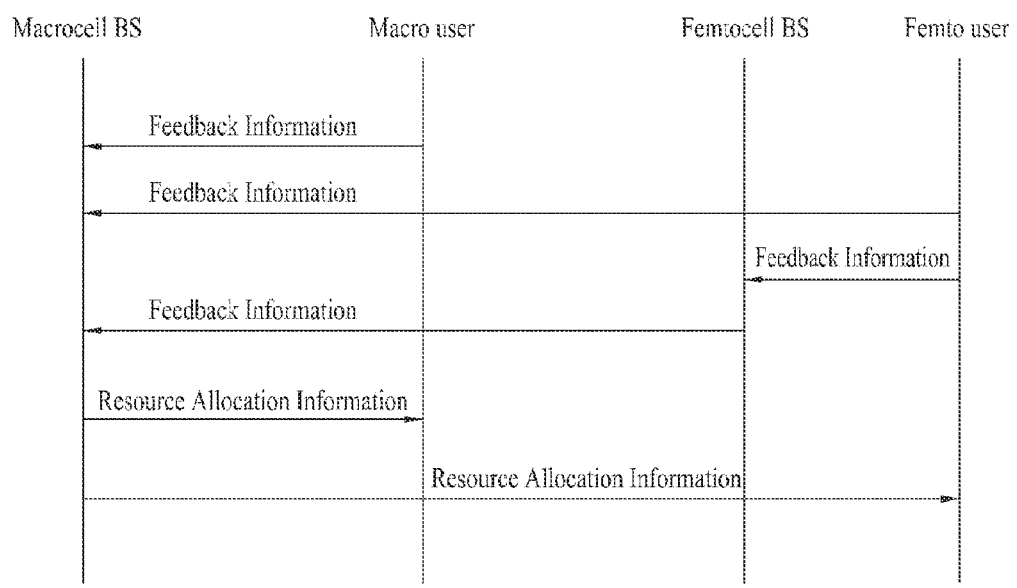
FIG. 2 illustrates an exemplary related art scheduling method performed by the macrocell base station.
Figure 3:
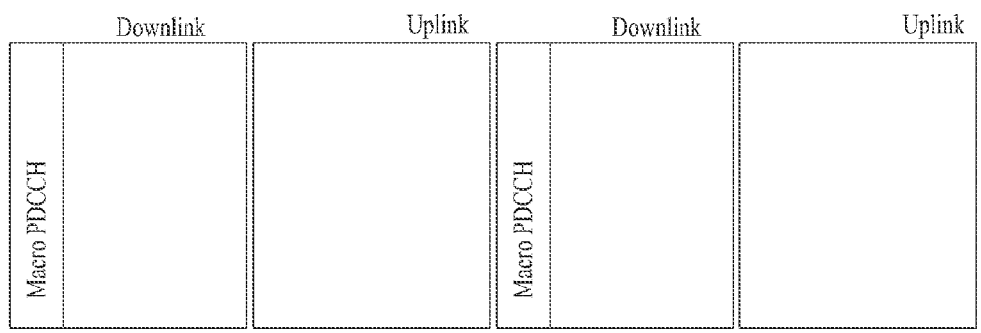
FIG. 3 illustrates a frame structure used by the related art macrocell base station for transmitting scheduling information.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a user device, a UE (User Equipment), an MS (Mobile Station), and so on. Additionally, it is also assumed that the base station universally refers to as an arbitrary node of a network end, which communicates with the user equipment, such as a Node B, an eNode B, a Base Station, and so on.

In a mobile communication system, a user equipment may receive information from a base station via downlink, and the user equipment may also transmit information via uplink. The information received or transmitted by the user equipment includes data and diverse control information. And, various physical channels may exist depending upon the type and purpose of the information received or transmitted by the user equipment.

Figure 4:
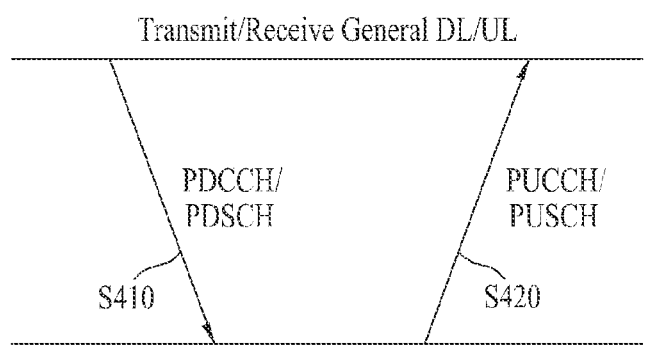
FIG. 4 illustrates general uplink/downlink transmission/reception used in a 3GPP (3rd Generation Partnership Project) LTE (Long Term Evolution) system, the 3GPP LTE system being an example of a mobile communication system.

FIG. 4 illustrates general uplink/downlink transmission/reception used in a 3GPP (3rd Generation Partnership Project) LTE (Long Term Evolution) system, the 3GPP LTE system being an example of a mobile communication system.

Referring to FIG. 4, as a general uplink/downlink signal transmission process, the base station transmits a signal through a physical downlink control channel/physical downlink shared channel (S410), and the user equipment may transmit a signal through a Physical Uplink Shared Channel (hereinafter referred to as a PUSCH)/Physical Uplink Control Channel (hereinafter referred to as a PUCCH) (S420).

At this point, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMI/RI through the Physical Uplink Shared Channel (PUSCH) and/or the Physical Uplink Control Channel (PUCCH).

In the following description, the present invention relates to operations performed in an environment having a Hierarchical Cell Structure. Herein, the Hierarchical Cell Structure refers to a structure consisting of a plurality of cells each having a small radius and being collectively included in a cell having a larger cover radius. More specifically, this structure refers to a case when many hierarchical layers are generated between cells due to the cover radius. For example, this may correspond to a case when femtocells configure a hierarchical structure with a Macrocell, which has a cover radius greater than the cover radius of each femtocell. In the description of the present invention, a macrocell base station may be referred to as macrocell, and a femtocell base station may be referred to as a femtocell for simplicity.

In the description of the present, an efficient method that will be used for allocating resources, when hierarchically allocating resources to each user equipment (or user device) (User Equipment or Mobile), will be described in detail.

Herein, each of the macrocell base station and the femtocell base station uses the same Frequency Band for allocating resource to the user belonging to the macrocell base station and the femtocell base station, respectively. At this point, various methods may be used in order to avoid interference between each user belonging to the macrocell and the femtocell from occurring.

However, in the description of the present invention, it will be assumed that a hierarchical scheduling method is used, wherein the macrocell first allocates resource to the macro user and the femtocell, and wherein, afterwards, the femtocell allocates resource to the femto user belonging to the femtocell itself within its own resource region. Instead of using the hierarchical method, the macro user uses the conventional scheduling method without any modification.

Furthermore, the present invention will propose diverse methods dealing with how the scheduling information is to be exchanged (or received and transmitted) between the macrocell base station and femtocell base station, and the users belonging to the macrocell base station and femtocell base station.

Figure 5:
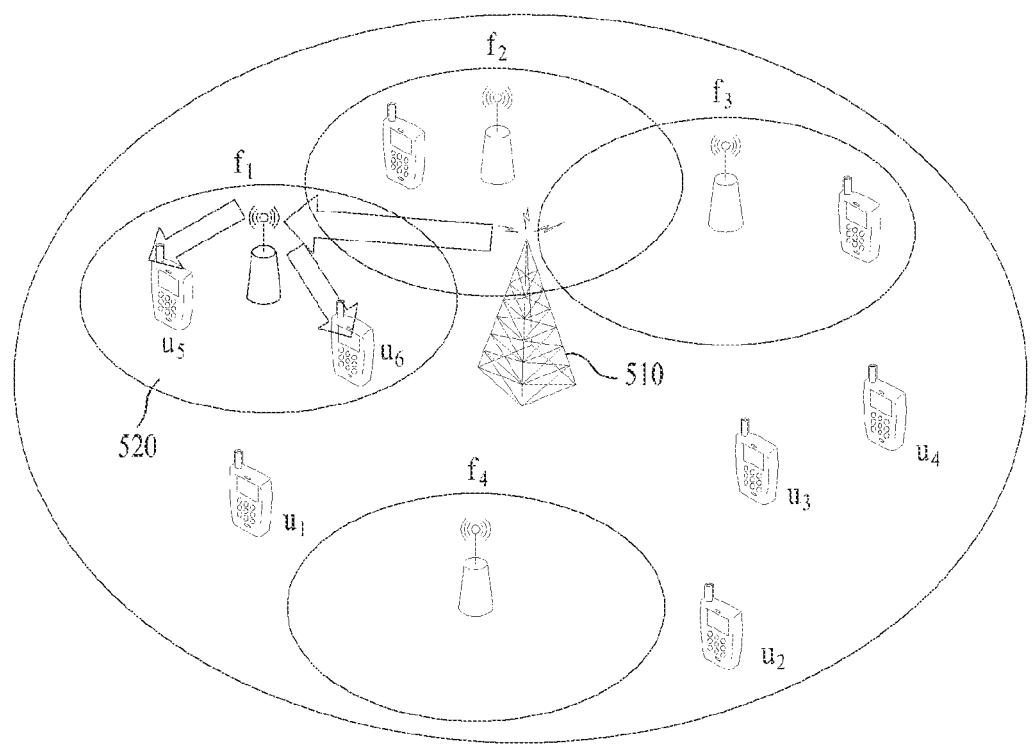
FIG. 5 illustrates a method wherein a femtocell base station is allocated with resources from a macro base station, just as a user equipment, thereby performing communication within a femtocell.

FIG. 5 illustrates a method wherein a femtocell base station is allocated with resources from a macro base station, just as a user equipment, thereby performing communication within a femtocell.

Referring to FIG. 5, in this embodiment of the present invention, an example of having a femtocell base station (f1) request a macrocell base station 510 for wireless (or radio) resource allocation, just as a user equipment is allocated with a radio resource from the macrocell base station 510. In order to do so, it is preferable that the femtocell base station (f1) requests for a radio resource allocation from the macrocell base station 510 by using a specific identifier having the same format as the identifier format of the user equipment. Respectively, as a response to the request for resource allocation made by the femtocell base station (f1), the macrocell base station 510 may allocate resource with respect to the above-described specific identifier, by using the same method for allocating radio resource to the user equipment. More specifically, when allocating the radio resource, the macrocell base station (510) is not required to differentiate the femtocell base station (f1) from a general user equipment.

For example, in case of the 3GPP LTE system, the femtocell base station requests the macrocell base station for resource allocation by using an identifier, such as a C-RNTI (Cell Radio Network Temporary Identifier), Semi-Persistent Scheduling C-RNTI, or a Temporary C-RNTI. Then, as a response to such request, the femtocell base station may receive radio resource allocation information from the macrocell base station. However, in the wireless communication system, if the identifier corresponds to an identifier that can be used by the base station in order to specify a user equipment when allocating the radio resource, it is not required to limit the format of the identifier only to the identifier format of the user equipment according to the embodiment of the present invention.

As described above, when the femtocell base station (f1) is allocated with radio resource from the macrocell base station 510, the femtocell base station (f1) may use the corresponding radio resource within its coverage area so as to communicate with the user equipment. However, the radio resource allocated to the femtocell base station is used only for the communication between the femtocell base station (f1) and the user equipment(s) (u5 and u6) within a femtocell region 520, which receives services from the femtocell base station (f1). Therefore, it should be noted that the radio resource allocated to the femtocell base station corresponds to a region that is not used for the communication between the femtocell base station (f1) and the macrocell base station 510 or in any other femtocell region.

Figure 6:
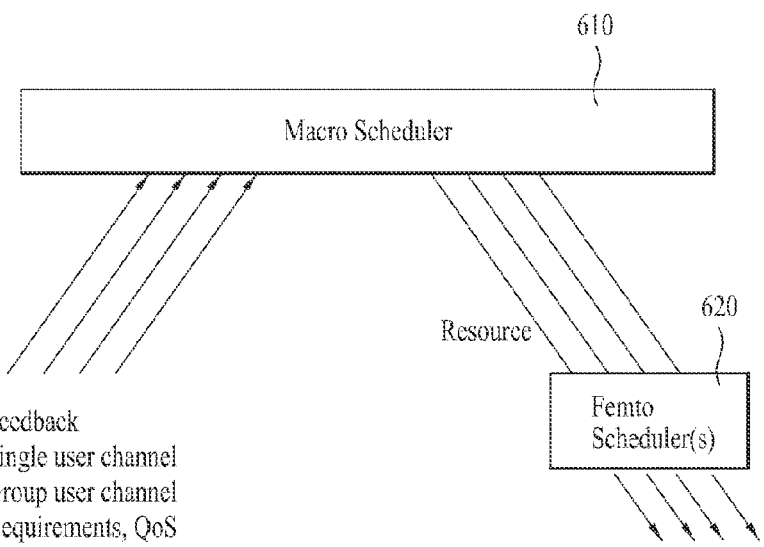
FIG. 6 illustrates a conceptual view of a hierarchical scheduling method according to the present invention in the perspective of a scheduler included in the macrocell base station.

FIG. 6 illustrates a conceptual view of a hierarchical scheduling method according to the present invention in the perspective of a scheduler included in the macrocell base station.

As shown in FIG. 6, a scheduler of the macrocell base station or a macrocell scheduler (or Macro Scheduler) 610 receives a resource allocation request signal from the user equipment(s). It will be assumed that the multiple user equipments, which are serviced by the wireless communication system, are grouped to a macro user group, which is directly serviced by macrocell base station, and a femto user group, which is serviced by each femto base station. Each user equipment may transmit unique user channel information, QoS (Quality of Service), and so on, to the macro scheduler (610) as feedback information for the resource allocation request. Meanwhile, it is proposed herein that the femtocell base station according to the embodiment of the present invention also requests the macro scheduler 610 for resource allocation by using the same method as the above-described user equipments.

Accordingly, the femtocell base station according to the embodiment of the present invention may transmit information, such as group user channel information within the corresponding femto user group, QoS, and so on, to the macro base station, just as the user equipment. Additionally, just as the user equipment, it is preferable for the femtocell base station to receive a pilot signal or a reference signal transmitted from the macrocell base station and to periodically or aperiodically report the respective channel status to the macrocell base station. And, it is also preferable for the femto base station to perform the procedure performed by the user equipment to acquire information on the identifier within a corresponding cell, or to perform an equivalent procedure, in order to use an identifier having the same format as the identifier of the user equipment, when requesting for resource allocation.

The identifier having the user equipment identifier format, which can be used by the femtocell base station, may correspond to the identifier of a specific user equipment within the corresponding femto user group, or may correspond to a specific identifier, which is allocated to the corresponding femtocell base station, so that the specific identifier can perform the role of a group identifier of the corresponding femto user group.

Meanwhile, it is not required for the macro scheduler 610 to determine whether the radio resource request is coming from the user equipment or from the femtocell base station. The macro scheduler 610 may use the feedback information received from the user equipment or from the femtocell base station so as to allocate radio resource to the respective user equipment or femtocell base station.

If the femtocell base station is the subject of the radio resource allocation, a scheduler of the corresponding femtocell base station or femto scheduler 620 may allocate the received radio resource to a user equipment within the corresponding femtocell, so that the corresponding radio resource can be used for the wireless communication within the femtocell.

As described above, according to the embodiment of the present invention, as the femtocell base station receives radio resource allocation, just as the user equipment, and allocates the received radio resource to user equipment(s) included in the corresponding femto user group, the radio resource may be efficiently allocated without modifying the macrocell base station. This is different from the method using a relay station, wherein the macrocell base station is required to recognize the relay station, and wherein the macrocell base station is required to modify the radio frame used by the macrocell base station in order to communicate with the relay station.

Hereinafter, a method for performing hierarchical scheduling according to diverse embodiments of the present invention will be described in detail. Hereinafter, among the many time units (e.g., 1 subframe, 1 slot, 2 or more subframes, 2 or more slots, and so on), 1 subframe will be given as an example of the time unit used in the present invention. Also, hereinafter, examples of a control channel, which is used by the macrocell base station and the femtocell base station for transmitting control information, may include PDCCH (Physical Downlink Control CHanne), DL/UL MAP, higher-level layer signaling, and so on. In the description of the present invention, an example of using the PDCCH will be given and described.

First Embodiment

Figure 7:
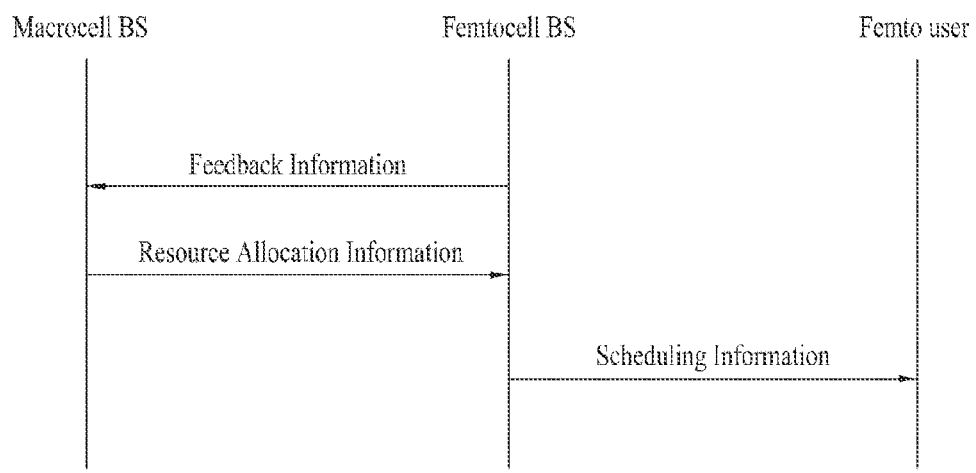
FIG. 7 illustrates an exemplary hierarchical scheduling method performed by a macrocell base station.

FIG. 7 illustrates an exemplary hierarchical scheduling method performed by a macrocell base station.

Referring to FIG. 7, in the first embodiment of the present invention, the femtocell base station may perform free scheduling. The macrocell base station may allocate resource to the femtocell base station based upon feedback information received from the femtocell base station. Herein, instead of performing allocation based upon each femto user, a predetermined amount of resource may be allocated in bulk to the femtocell base station. The feedback information may include information, such as channel status of femto users belonging to the femtocell, requested amount of resource, and so on. The femtocell base station may broadcast scheduling information for allocating resource to the femto users, which belong to the corresponding femtocell base station, through a pre-decided femto control channel (e.g., femto physical downlink control channel (femto PDCCH)), and each the corresponding femto users may receive the scheduling information, thereby being capable of recognizing which resource the femto user is to used in order to perform communication. As a control channel, the PDCCH corresponds to a channel that can transmit transmission formation, uplink/downlink resource allocation information, and so on.

Figure 8:
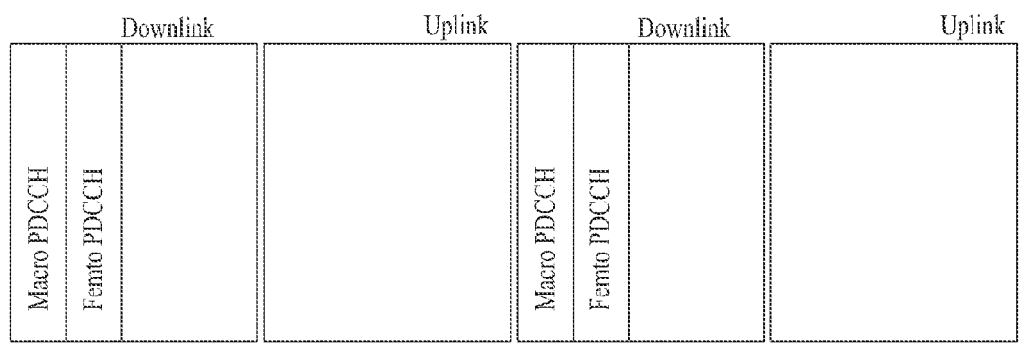
FIG. 8 illustrates an exemplary frame structure for transmitting scheduling information according to the exemplary embodiment shown in FIG. 7.

FIG. 8 illustrates an exemplary frame structure for transmitting scheduling information according to the exemplary embodiment shown in FIG. 7.

In the exemplary embodiment of the present invention shown in FIG. 8, since free scheduling of the femtocell base station may be performed, the femtocell base station may perform scheduling for its user on its own. And, therefore, it is advantageous in that user equipments including those having poor reception from the macrocell base station may receive scheduling information from the femtocell base station. If the femtocell base station receives scheduling information from the macrocell base station, a time interval during which the femtocell base station may perform rescheduling to its users within its own resource area may be short. More specifically, since the femtocell base station is required to receive scheduling information from the macrocell base station and to immediately broadcast the received scheduling information, it is preferable that the time required for performing reception/transmission (or turn around time) is set to be relatively short. At this point, the femtocell base station may broadcast scheduling information by using a PDCCH section of a separate femto other than a macro PDCCH, which carries the scheduling information transmitted from the macrocell base station. Also, in the first embodiment of the present invention, the femto PDCCH section may correspond to a section that is commonly used and shared by all femtos.

Second Embodiment

Figure 9:
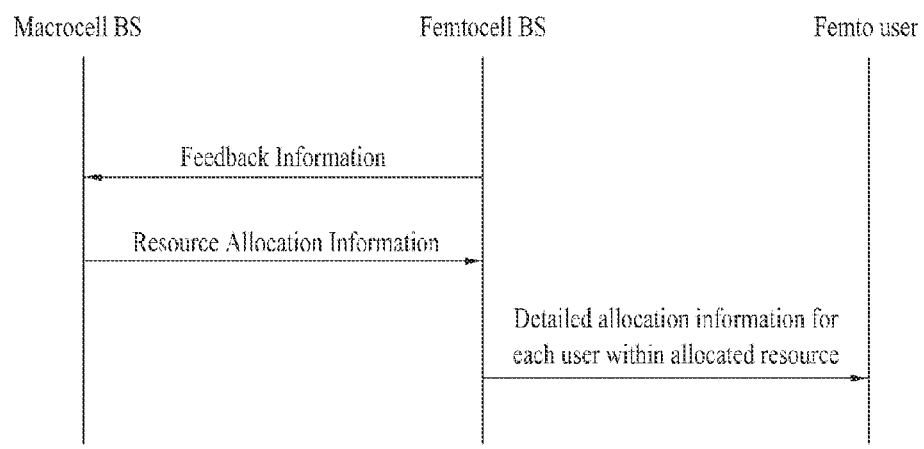
FIG. 9 illustrates an exemplary hierarchical scheduling method performed by a macrocell base station.

FIG. 9 illustrates an exemplary hierarchical scheduling method performed by a macrocell base station.

Referring to FIG. 9, in the second embodiment of the present invention, the macrocell base station allocates bulk resource to the femtocell base station. And, accordingly, the femtocell base station uses a starting portion of its allocated resource area so as to broadcast scheduling information for the femto users.

More specifically, when the femtocell base station transmits feedback information (e.g., requested resource amount, channel status information) to the macrocell base station, the macrocell base station may allocate resource in bulk resource matching the requested resource amount and the channel status of the femtocell base station, based upon the received feedback information. Accordingly, the femtocell base station may use the starting portion of the corresponding resource, so as to broadcast in detail which resource is to be allocated to the femto user and how corresponding resource is to be allocated, the femto user belonging to the femtocell base station. Each femtocell base station s given a separate PDCCH section within each of the allocated resource. At this point, each femto user may receive the PDCCH of the macrocell base station, thereby being capable of knowing which resource area is allocated to the serving femtocell base station of the corresponding femto user. And, by reading the first portion of this area, the corresponding femto user may know the location where the resource, which is to be used by the femto user, is located.

Figure 10:
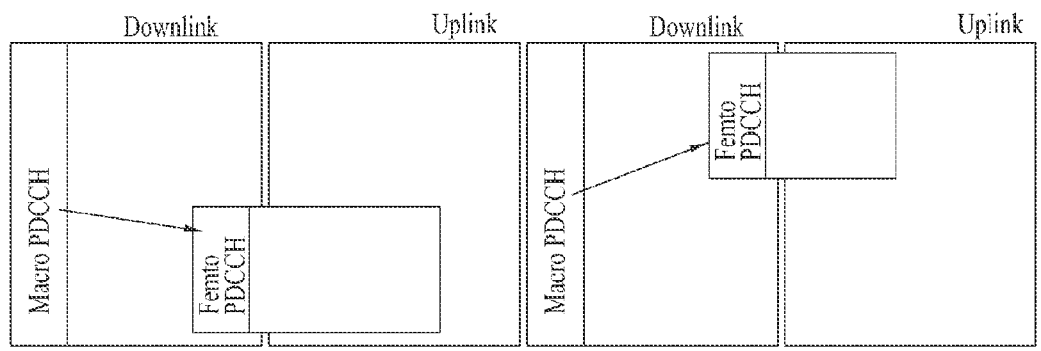
FIG. 10 illustrates an exemplary frame structure for transmitting scheduling information according to the exemplary embodiment shown in FIG. 9.

FIG. 10 illustrates an exemplary frame structure for transmitting scheduling information according to the exemplary embodiment shown in FIG. 9.

The macrocell base station may use a macro PDCCH section from the downlink section so as to transmit bulk resource allocation information to the femtocell base station. Herein, when the femtocell base station receives resource allocation information from the macrocell base station through a macro PDCCH, the femtocell base station may be capable of knowing which resource area has been allocated to its serving femtocell base station. And, by reading the first portion of this area, the femtocell base station may be capable of knowing where the resource, which the femtocell base station is about to use, is located. The femtocell base station may use the starting portion of its allocated resource area within the macro PDCCH section, thereby being capable of broadcasting the scheduling information for the femto user(s). Herein, the femto PDCCH information may vary with respect to the femto user, the femtocell base station.

According to the second embodiment of the present invention, the femtocell base station may perform free scheduling. And, by broadcasting the PDCCH information from its resource area, the femtocell base station may receive the PDCCH of the macrocell base station, and may gain more time for performing scheduling once again. And, herein, the required time may also be sufficient. However, in this case, a user equipment having poor reception from the macrocell base station may not be capable of locating the area of its serving femtocell base station.

Third Embodiment

Figure 11:
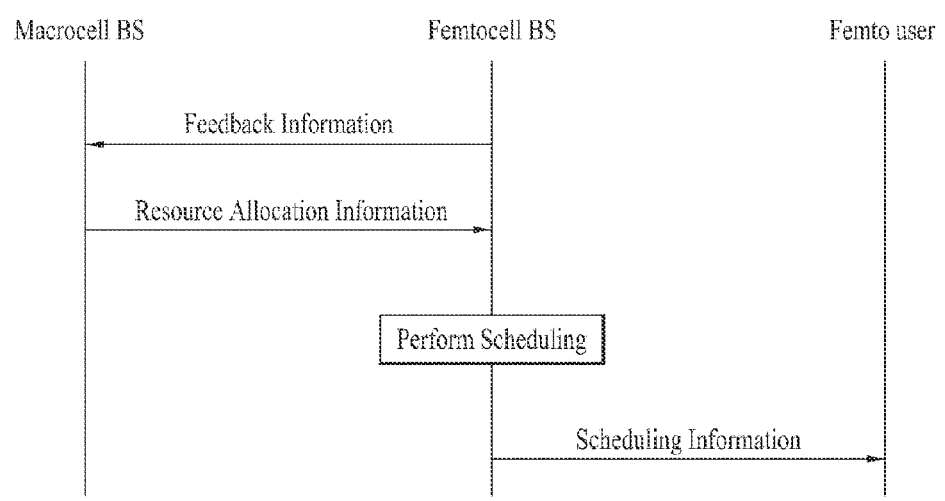
FIG. 11 illustrates an exemplary hierarchical scheduling method performed by a macrocell base station.

FIG. 11 illustrates an exemplary hierarchical scheduling method performed by a macrocell base station.

Referring to FIG. 11, in the third embodiment of the present invention, the femtocell base station may transmit feedback information to the macrocell. At this point, the feedback information may include information, such as channel status information, required resource amount, and so on. After receiving such feedback information, the macrocell base station may allocate resource in bulk to the femtocell base station. More specifically, the macrocell base station may transmit resource allocation information for the femtocell base station in subframe units, by using a downlink control channel (e.g., macrocell PDCCH) of a subframe. The femtocell base station may broadcast scheduling information for the femto user to a scheduling information broadcasting part of the macrocell base station. At this point, interference may occur due to scheduling information broadcasting of the macrocell base station.

Figure 12:
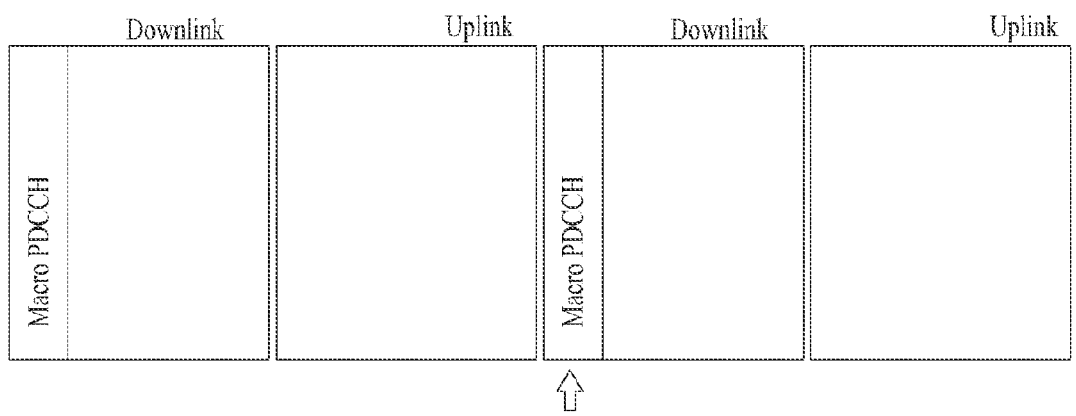
FIG. 12 illustrates an exemplary frame structure for transmitting scheduling information according to the exemplary embodiment shown in FIG. 11.

FIG. 12 illustrates an exemplary frame structure for transmitting scheduling information according to the exemplary embodiment shown in FIG. 11.

According to this embodiment of the present invention, the overall process may occur throughout 2 subframes. In a macro PDCCH section of a $1^{st}$ subframe, the macrocell base station may allocate resource in bulk to the femtocell base station. More specifically, a whole bulk of resource required by the corresponding femtocell base station may be allocated. Accordingly, based upon the allocated resource, the femtocell base station may perform scheduling in detail on how to allocate the received resource to its femto users. Such scheduled information may be broadcasted by the femtocell base station itself by using a macro PDCCH section of a $2^{nd}$ subframe. The femto user may receive such information and may know from which location the corresponding femto user shall perform communication.

In FIG. 12, a macrocell base station specific control channel and a femtocell base station specific control channel may be differentiated from one another by at least one of time, frequency, and coded within a subframe. Meanwhile, the femto PDCCH may overlay with the macro PDCCH, thereby generating interference. The femtocell base station may endure such interference and transmit PDCCH information at the same timing.

Also, in this embodiment of the present invention, although the present invention operates in 2-subframe units, since a process on a current frame and a process on a previous frame co-exist in the same subframe, in light of a throughput, no modification occurs. The advantage of this embodiment of the present invention is that the present invention may be operated without any separate modification in the frames, and that even user equipments having poor reception from the macrocell base station may operate without any problem. As the operation is performed throughout 2 subframes, in case a Channel Coherent Time is shorter than 2 subframes, the channel feedback information and the channel status corresponding to a point when the resource is actually used may be different from one another. Furthermore, since the macro PDCCH may overlay with the femto PDCCH, interference may occur in the PDCCH for a macro user belonging to a region of the femtocell.

Fourth Embodiment

Figure 13:
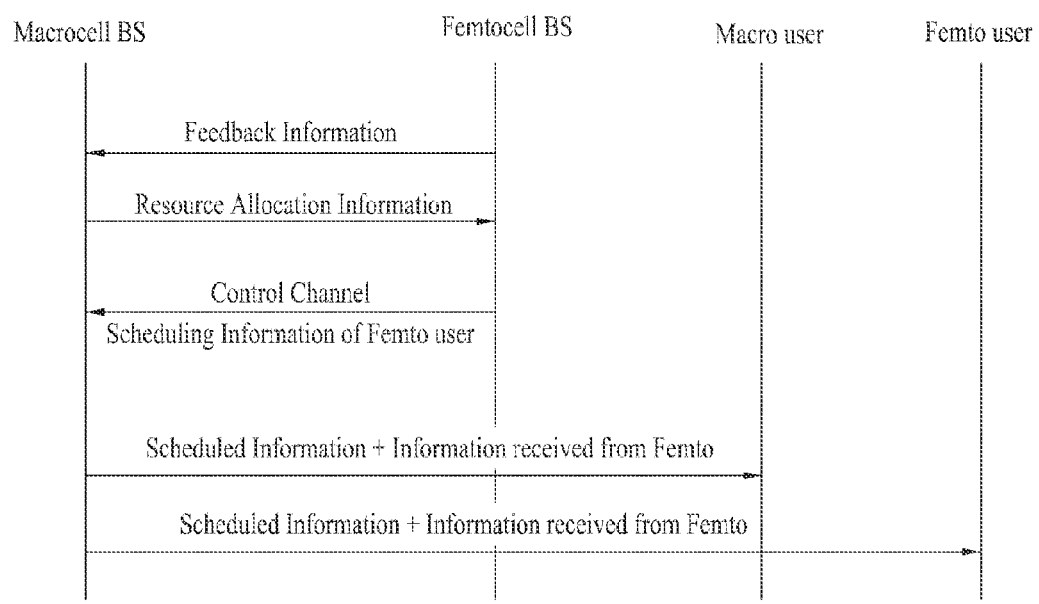
FIG. 13 illustrates an exemplary hierarchical scheduling method performed by a macrocell base station.

FIG. 13 illustrates an exemplary hierarchical scheduling method performed by a macrocell base station.

Referring to FIG. 13, in the fourth embodiment of the present invention, the femtocell base station may transmit feedback information to the macrocell. At this point, the feedback information may include information, such as channel status information, required resource amount, and so on. Based upon the received feedback information, the macrocell base station may allocate resource (or bulk resource) to the femtocell base station. After performing the scheduling of the femto user, the femtocell base station may upload the information back to the macrocell base station. Then, the corresponding information may be broadcasted from a macro scheduling information broadcasting region of the next subframe. In the fourth embodiment, the present invention may also operate throughout 2 subframes.

In a $1^{st}$ subframe, the macrocell base station may transmit information on the allocated resource (e.g., bulk resource) to the femtocell base station. Thereafter, the femtocell base station completes the scheduling for the femto users belonging to the femtocell base station within the time period of the $1^{st}$ subframe, and, by performing a control operation, the femtocell base station may use the allocated resource so as to transmit the scheduled information to the macrocell base station. Accordingly, the macrocell base station may further include the information scheduled by the macrocell base station itself and the scheduling information received from the femtocell base station in the overall $2^{nd}$ subframe PDCCH, so as to perform an overall broadcasting. The femto user then receives this signal so to determine from which area (or region) the corresponding femto user shall perform communication.

Figure 14:
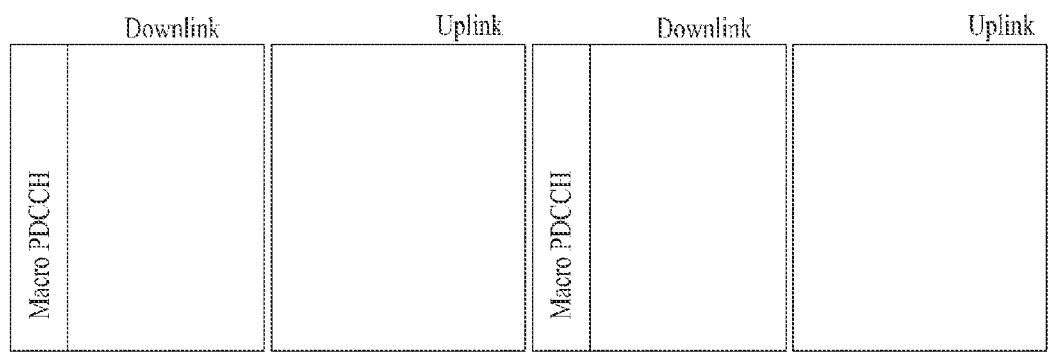
FIG. 14 illustrates an exemplary frame structure for transmitting scheduling information according to the exemplary embodiment shown in FIG. 13.

FIG. 14 illustrates an exemplary frame structure for transmitting scheduling information according to the exemplary embodiment shown in FIG. 13.

As shown in FIG. 14, as long as the user equipment can receive only the macro PDCCH information, the user equipment may operate correctly. The femtocell base station may transmit the scheduled information to the macrocell base station by using an uplink transmission. Therefore, due to such overhead, the overall throughput may be more or less reduced. Futhermore, if the user equipment receives poor reception from the macrocell base station, the corresponding user equipment may not be able to receive the PDCCH information.

Fifth Embodiment

Figure 15:
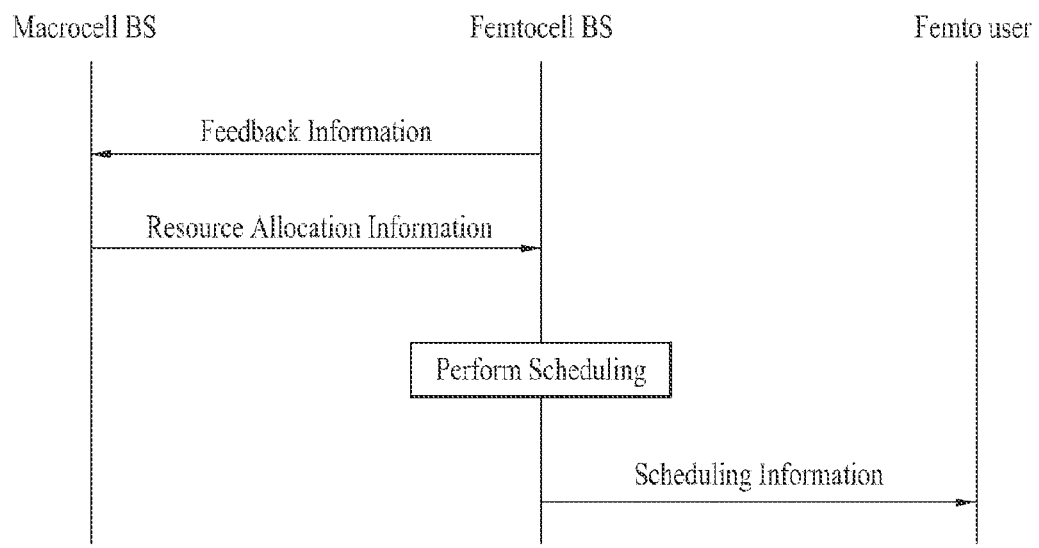
FIG. 15 illustrates an exemplary hierarchical scheduling method performed by a macrocell base station.

FIG. 15 illustrates an exemplary hierarchical scheduling method performed by a macrocell base station.

Referring to FIG. 15, in the fourth embodiment of the present invention, the femtocell base station may transmit feedback information to the macrocell. At this point, the feedback information may include information, such as channel status information, required resource amount, and so on. Based upon the received feedback information, the macrocell base station may allocate bulk resource to the femtocell base station. The macrocell base station may transmit bulk resource allocation information to the femtocell base station by using a macro PDCCH section in a $1^{st}$ subframe. Thereafter, the femtocell base station may transmit scheduling information of the femto user to the femto user by using a femto PDCCH section in a $2^{nd}$ subframe. At this point, the femto PDCCH section of the $2^{nd}$ subframe may correspond to a section immediately following the macro PDCCH section of the $2^{nd}$ subframe.

Figure 16:
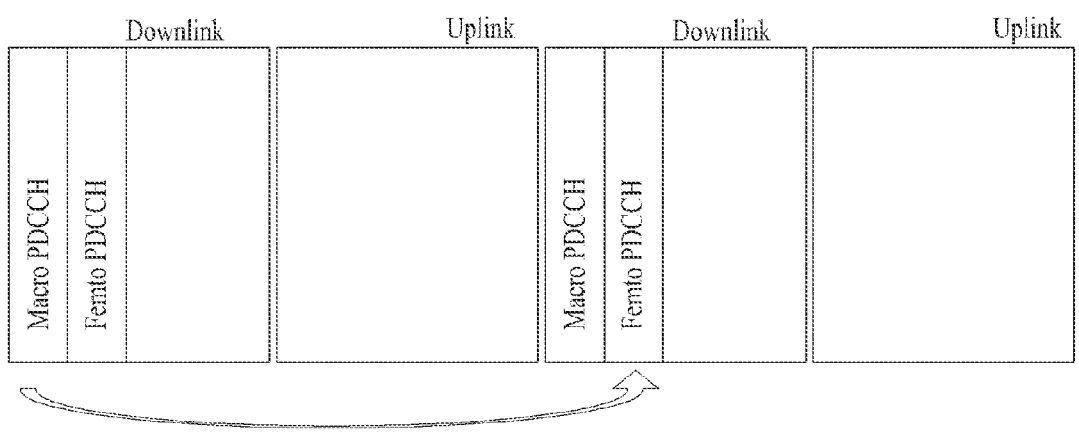
FIG. 16 illustrates an exemplary frame structure for transmitting scheduling information according to the exemplary embodiment shown in FIG. 15.

FIG. 16 illustrates an exemplary frame structure for transmitting scheduling information according to the exemplary embodiment shown in FIG. 15.

According to the embodiment of the present invention, shown in FIG. 16, the present invention may also operate throughout 2 subframes. The macrocell base station may transmit resource allocation information to the femtocell base station through a macro PDCCH section of a $1^{st}$ frame. Accordingly, the femtocell base station may perform scheduling for the femto user belonging to the femtocell base station itself by using the resource allocation information received from the macrocell base station. Furthermore, by broadcasting signals by using the femto PDCCH section within a $2^{nd}$ subframe, the femtocell base station may transmit scheduling information to the femto user.

As a characteristic of the fifth embodiment of the present invention, even if the user equipment receives poor reception from the macrocell base station, as long as the user equipment receives only the femto PDCCH, the user equipment may acquire the scheduling information. However, due to the allocation of a separate femto PDCCH section, the overhead may be more or less increased. As shown in FIG. 16, a macrocell base station specific control channel and a femtocell base station specific control channel may be differentiated from one another by at least one of time, frequency, and coded within a subframe.

Meanwhile, a method of using a combination of the first embodiment to the fifth embodiment may also be considered. In the first embodiment to the fifth embodiment, user equipments receiving poor reception from the macrocell base station may also be operated.

More specifically, this is because as long as the user equipment is capable of receiving only the PDCCH information of the femtocell base station, the user equipment may be aware of the resource area that is to be used by the corresponding user equipment. The remaining second embodiment to fourth embodiment may be more suitable for the operation of user equipments receiving excellent reception of the macrocell base station. Therefore, the femtocell base station may differentiate user equipments receiving excellent reception from the macrocell base station from user equipments receiving poor reception from the macrocell base station. Then, by using a hybrid method of the first to fifth embodiments, scheduling information of the macrocell base station, the femtocell base station, and the users may be exchanged among one another.

Sixth Embodiment

Figure 17:
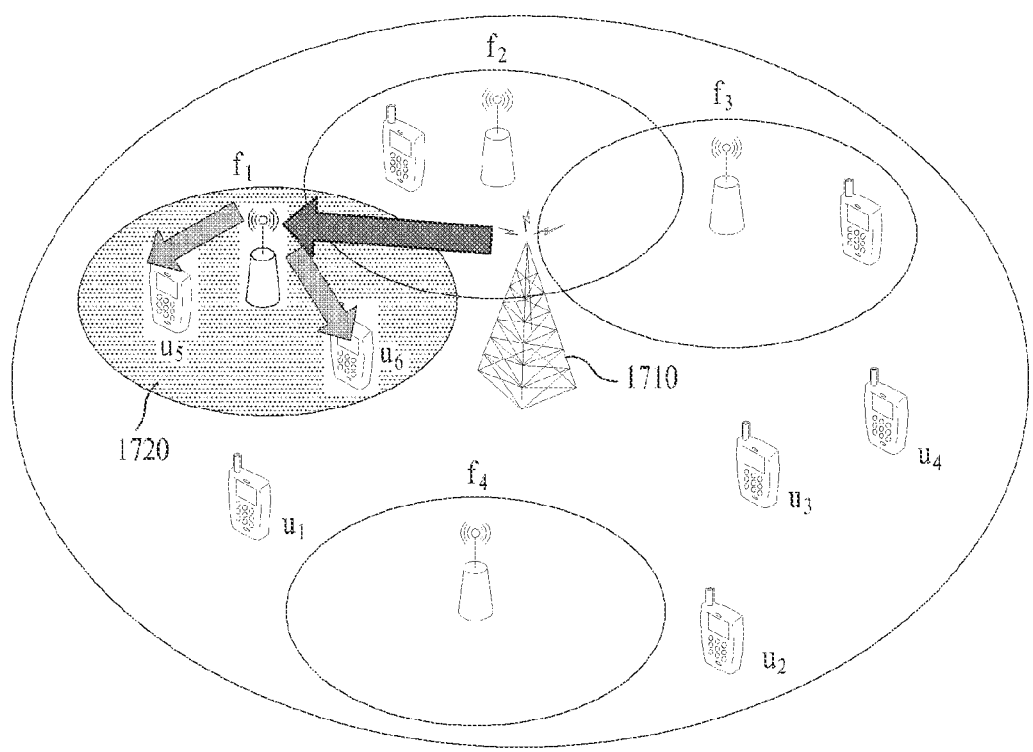
FIG. 17 illustrates a method wherein a femtocell base station is allocated with resources from a macro base station, just as a user equipment, thereby performing communication within a femtocell.

FIG. 17 illustrates a method wherein a femtocell base station is allocated with resources from a macro base station, just as a user equipment, thereby performing communication within a femtocell.

Referring to FIG. 17, a femtocell base station (f1) may request a macrocell base station 1710 for wireless (or radio) resource allocation. In order to do so, the femtocell base station (f1) may request for a radio resource allocation from the macrocell base station 1710 by using a specific identifier having the same format as the identifier format of the user equipment. Respectively, as a response to the request for the radio resource allocation made by the femtocell base station (f1), the macrocell base station 1710 may allocate radio resource with respect to the above-described specific identifier, by using the same method for allocating radio resource to the user equipment. More specifically, when allocating the radio resource, the macrocell base station 1710 is not required to differentiate the femtocell base station (f1) from macro user equipments (u1, u2, u3, u4).

For example, in case of the 3GPP LTE system, which corresponds to an example of a mobile communication system, the femtocell base station (f1) requests the macrocell base station 1710 for resource allocation by using an identifier, such as a C-RNTI (Cell Radio Network Temporary Identifier), Semi-Persistent Scheduling C-RNTI, or a Temporary C-RNTI. Then, as a response to such request, the femtocell base station (f1) may receive radio resource allocation information from the macrocell base station 1710. However, in the wireless communication system, if the identifier corresponds to an identifier that can be used by the base station in order to specify a user equipment when allocating the radio resource, it is not required to limit the format of the identifier only to the identifier format of the user equipment according to the embodiment of the present invention.

As described above, when the femtocell base station (f1) is allocated with radio resource from the macrocell base station 1710, the femtocell base station (f1) may allocate the corresponding radio resource to femtocell user equipments (u5, u6), which are located in the coverage area of the femtocell base station (f1). Accordingly, by using the radio resource allocated from the macrocell base station 1710, the femtocell base station (f1) may perform communication with the user equipment(s) (u5 and u6) within the coverage. At this point, the radio resource allocated to the femtocell base station (f1) may correspond to resource that is not used for the communication between the femtocell base station (f1) and the macrocell base station 1710 or used in other femtocell regions. By allocating the received radio resource to femtocell user equipments (u5, u6) included in its coverage, the femtocell base station (f1) does not modify the macrocell base station 1710. Thus, the radio resource may be efficiently allocated.

Figure 18:
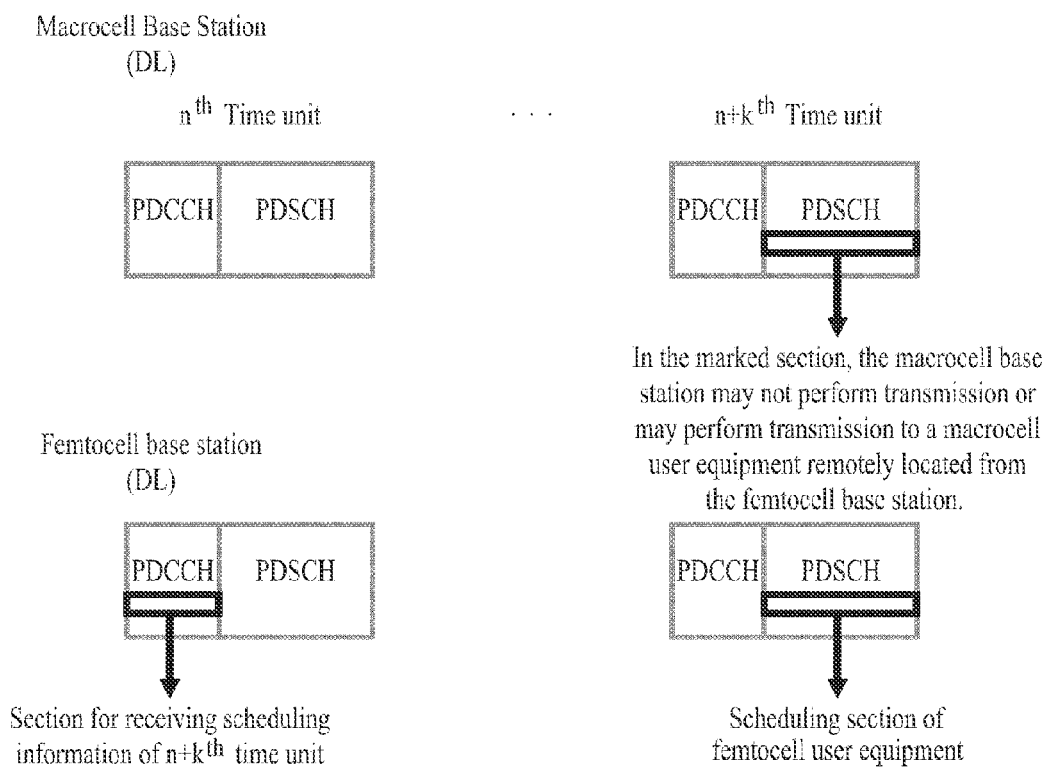
FIG. 18 illustrates an exemplary frame structure for performing hierarchical scheduling according to an exemplary embodiment of the present invention.

FIG. 18 illustrates an exemplary frame structure for performing hierarchical scheduling according to an exemplary embodiment of the present invention.

Referring to FIG. 18, downlink scheduling performed in a 3GPP LTE system, which is an example of a mobile communication system, will hereinafter be described in detail. Since FIG. 18 will be described based upon the LTE system, for simplicity, control information for scheduling, and so on, may be transmitted to channels and control signals having different names in each communication standard.

The femtocell base station may receive Predefined Scheduling information from the macrocell base station through a specific channel (e.g., PDCCH (Physical Downlink Control CHannel) in $N^{th}$ time unit (wherein N is an integer). Thereafter, the femtocell base station transmits scheduling information including information on resources that are to be allocated to one or more femtocell user equipments, which belong to the femtocell base station itself, from the macrocell base station in $N+M^{th}$ time unit (wherein M is an integer, and wherein $1 \leq M \leq K$) through a specific femto control channel (e.g., femto physical downlink control channel (femto PDCCH)). The corresponding femtocell user equipments receive this information, thereby being capable of knowing which resource the femtocell base station is supposed to use in order to perform communication. Thereafter, the femtocell base station may schedule the resource, which is allocated to the femtocell base station from the macrocell base station starting from $N+K^{th}$ time unit (wherein K is an integer), to one or more femtocell user equipments, which are serviced by the femtocell base station. In case of the LTE system, in order to match the time interval between a UL grant and an uplink transmission, the value k may be set to 4.

Herein, the resource that is once allocated to the femtocell base station from the macrocell base station through scheduling may correspond to resource allocated so that the femtocell base station can consecutively use the allocated resource (i.e., time N+K, N+K+1, N+K+2, ..., N+K+L−1) for a predetermined period of time units (for a period of L time units), or the allocated resource may correspond to resource that is allocated for a periodic use (e.g., when the cycle period is set to P, time N+K, N+2K+P, N+K+2P, ... )). As described above, the scheduling information, which is transmitted from the macrocell base station to the femtocell base station, may include information indicating whether the resource that is to be allocated once is supposed to be used consecutively, or whether the corresponding resource is supposed to be used periodically.

The femtocell base station may schedule one or more femtocell user equipments, which exist within the femtocell, starting from $N+K^{th}$ time unit. Based upon the received scheduling information, the femtocell base station may perform scheduling on the femtocell user equipment(s). At this point, in case resource is allocated so that scheduling can be performed in consecutive time units starting from $N+K^{th}$ time unit, the femtocell base station may perform scheduling on the at least one or more femtocell user equipments during a period of consecutive time units (e.g., $N+K^{th}$, $N+K+1^{th}$, $N+K+2^{th}$, ..., $N+K+L-1^{th}$ time units). Alternatively, in case resource is allocated so that scheduling can be performed in period time units starting from $N+K^{th}$ time unit, the femtocell base station may perform scheduling on the at least one or more femtocell user equipments in accordance with periodic time units (e.g., when the cycle period is set to P, $N+K^{th}$ time unit, $N+2K+P^{th}$ time unit, $N+K+2P^{th}$ time unit, ... ). More specifically, the femtocell base station may transmit a signal (or data) to the at least one or more femtocell user equipments in consecutive time units or in periodic time units starting from $N+K^{th}$ time unit.

As described above, based upon the scheduling information received from the macrocell base station, the femtocell base station may perform scheduling on one or more femtocell user equipments, which are serviced by the femtocell base station itself. At this point, the scheduled information may be notified to the one or more femtocell user equipments. At this point, in case the femtocell base station periodically uses the resource, which is allocated once from the macrocell base station, for the femtocell user equipments, in the LTE system, the macrocell base station may notify the scheduling information to the femtocell base station by using a signal having the same format as a semi-persistent scheduling.

In light of the femtocell user equipment, the femtocell user equipment may receive scheduling from the femtocell base station during a consecutive time unit period or during a periodic time unit period. After the femtocell base station receives scheduling information from the macrocell base station in $N^{th}$ time unit, the one or more femtocell user equipments may receive scheduling information including information on resources that are to be allocated to one or more femtocell user equipments, which belong to the femtocell base station itself, from the macrocell base station in $N+M^{th}$ time unit (wherein M is an integer, and wherein $1 \leq M - K$) through a specific femto control channel (e.g., femto physical downlink control channel (femto PDCCH)). Therefore, each the one or more femtocell user equipments may know at which time unit the corresponding femtocell user equipment is scheduled.

In light of the macrocell base station, the macrocell base station may not transmit a signal from a PDSCH section allocated to the femtocell base station at $N+K^{th}$ time unit, and the macrocell base station may transmit a signal to a macrocell user equipment, which is located at a position remotely space apart from the femtocell base station. At this point, in case the macrocell base station transmits a signal at $N+K^{th}$ time unit, in order to avoid causing interference in the femtocell user equipment, the macrocell base station is required to adjust a power transmission size.

As described above, the description of the present invention is given under the assumption that the macrocell base station transmits a signal for allocating the radio resource to the femtocell base station through a PDCCH. However, this is merely an example given to simplify the description of the present invention. And, therefore, the signal may be transmitted through various control channels. Also, the macrocell base station may transmit radio resource allocation to the femtocell base station through a higher-level layer signal. Furthermore, the macrocell base station may transmit signals by using an R-PDCCH (Relay-Physical Downlink Control CHannel), which is transmitted to the control channel designed for the relay station, in the PDSCH region. Alternatively, the macrocell base station may also perform transmission by using a wired Backhaul network, which is connected to the femtocell base station.

Hereinafter, referring to FIG. 18, uplink scheduling performed in a 3GPP LTE system, which is an example of a mobile communication system, will hereinafter be described in detail.

The above-described methods may be similarly applied to uplink resources. Herein, uplink scheduling may be performed in $N^{th}$ time unit, by using the same method for downlink scheduling, which is described with reference to FIG. 18. Herein, after receiving predecided scheduling information from the macrocell base station through a specific control channel (e.g., PDCCH), the femtocell base station may notify scheduling information including information on resources from the macrocell base station in $N+M^{th}$ time unit (wherein M is an integer, and wherein $1 \leq M \leq K$) through a specific femto control channel (e.g., femto physical downlink control channel (femto PDCCH)) to one or more femtocell user equipments. Subsequently, the femtocell base station may perform scheduling to the femtocell user equipments in $N+K^{th}$ time unit. Accordingly, just as in the downlink scheduling, the femtocell base station uses the resource information allocated once from the macrocell base station, so as to perform uplink scheduling to one or more femtocell user equipments in consecutive time units or periodic time units for a predetermined period of time.

In light of the femtocell user equipment, when the femtocell user equipment receives scheduling from the femtocell base station during a consecutive time unit period or during a periodic time unit period, the femtocell user equipment may transmit a signal through an uplink transmission in the allocated consecutive time units or periodic time units. The above-described time units may correspond to subframe units or slot units.

According to the above-described exemplary embodiments of the present invention, hierarchical radio resource scheduling may be efficiently realized while minimizing the change in the conventional system. Also, according to a specific embodiment of the present invention, the radio resource allocated to the femtocell base station may use a characteristic that is used within the corresponding femtocell, so as to realize communication between the user equipments included in the femtocell. And, herein, Spatial Reuse may also be realized.

As described above, a method for hierarchically performing scheduling in the macrocell base station according to multiple exemplary embodiments of the present invention is described in detail with reference to FIG. 7 to FIG. 14. Although a TDD (Time Division Duplex) frame structure has been given as an example for describing the method of the macrocell base station for performing hierarchical scheduling, in order to simplify the description of the present invention, the above-described may also be applied in other diverse systems, such as an FDD (Frequency Division Duplex) frame structure.

Furthermore, the method for hierarchically performing scheduling according to the present invention may also be applied to other mobile communication systems, such as 3GPP LTE, LTE-A, IEEE 802.16m, and so on.

Figure 19:
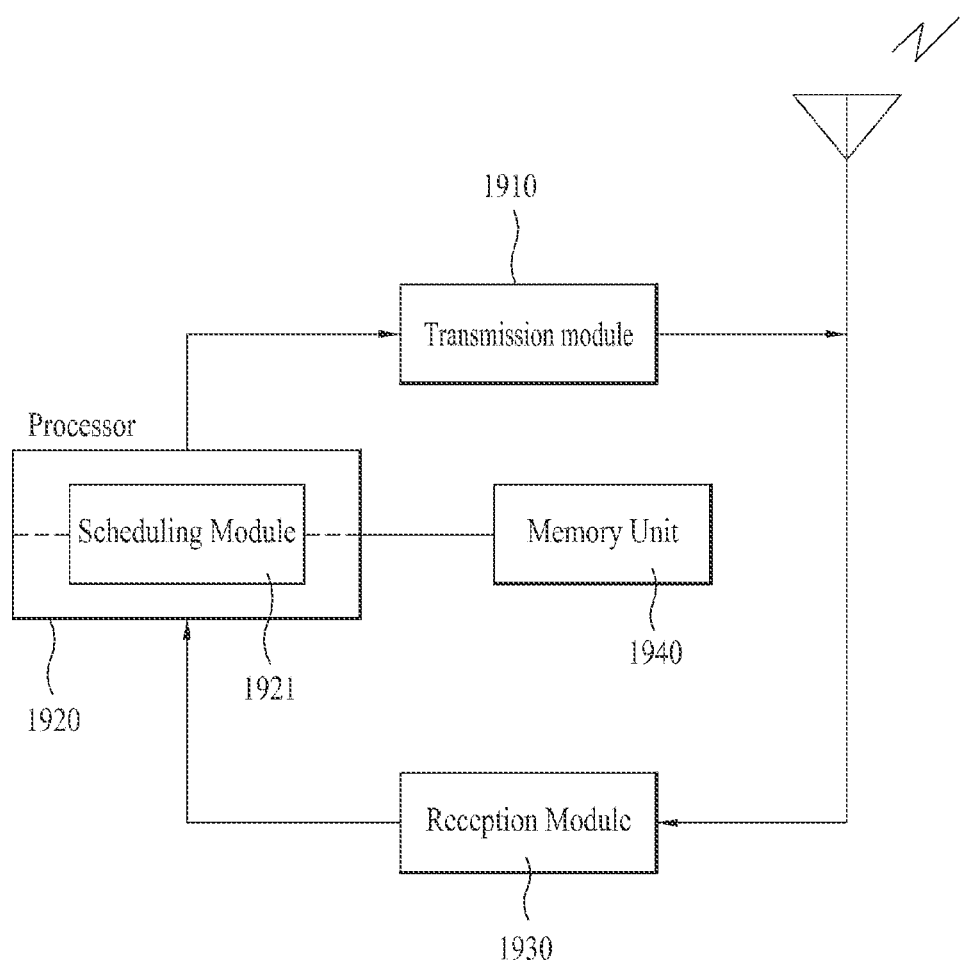
FIG. 19 illustrates a device for performing scheduling according to a preferred embodiment of the present invention.

FIG. 19 illustrates a device for performing scheduling according to a preferred embodiment of the present invention.

Referring to FIG. 19, an apparatus for performing scheduling according to the present invention may correspond to a femtocell base station, a macrocell base station, or a user equipment. Herein, the apparatus for performing scheduling may include a transmission module 1910, a processor 1920, a reception module 1930, and a memory unit 1940. The processor 1920 may include a scheduling module 1921. First of all, an example of the apparatus for performing scheduling being a femtocell base station device will be described in detail.

The reception module 1930 may receive scheduling information from the macrocell base station, the scheduling information including resource allocation respective to the femtocell base station in $N^{th}$ time unit (wherein N is an integer).

The scheduling module 1921 uses the received scheduling information so as to perform scheduling on a resource, which is to be used by one or more femtocell user equipments, in one or more time units starting from the $N+K^{th}$ time unit (wherein K is an integer), the femtocell user equipments being serviced by the femtocell base station.

The transmission module 1910 may transmit scheduling information, which is received from the macrocell base station, to one or more femtocell user equipments in $N+M^{th}$ time unit (wherein M is an integer, and wherein 1≤M≤K). Also, the transmission module 1910 may optionally transmit a signal requesting for resource allocation to the macrocell base station.

The memory unit 1940 may store information received from an outside source or scheduling performance results for a predetermined period of time.

Subsequently, an example of the apparatus for performing scheduling corresponding to the macrocell base station device will now be described.

The macrocell base station device according to the present invention may include a transmission module 1910, a processor 1920, a reception module 1930, and a memory unit 1940. The processor 1920 may include a scheduling module 1921.

The transmission module 1910 may transmit scheduling information including information on the resource allocated to the femtocell base station in $N^{th}$ time unit (wherein N is an integer).

With the exception for the user equipments being serviced by the femtocell base station in one or more time units allocated to the femtocell base station starting from the $N+K^{th}$ time unit (wherein K is an integer), the scheduling module (1921) may perform scheduling on the one or more user equipments being serviced by the macrocell base station. The transmission module 1910 may transmit a signal to the macrocell base station for a predetermined period of consecutive time units or periodic time units starting from the $N+K^{th}$ time unit (wherein K is an integer).

As described above, in a mobile communication system having a hierarchical cell structure, when the femtocell base station schedules the usage of resource by cooperating with the macrocell base station, in order to service femto user equipments belonging to the femtocell base station, the description of the present invention describes how the information should be received and transmitted. When networks each having a different coverage radius, such as a cellular network and a femtocell network, co-exist by using the same frequency domain, resource allocation may be dynamically performed by reflecting the demands of the users belonging to each network.

As described above, a detailed description of the preferred embodiments of the present invention disclosed herein is provided so that anyone skilled in the art can be capable of realizing and performing the present invention. It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention. For example, anyone skilled in the art may apply the exemplary embodiments presented herein by combining each structure disclosed in the description of the present invention.

Therefore, the present invention will not be limited only to the exemplary embodiments disclosed herein. Instead, the present invention seeks to provide a broader scope of the present invention best fitting the disclosed principles and new characteristics of the invention described herein.

Industrial Applicability

The apparatus for transmitting scheduling information in a mobile communication system and a method for the same may be applied to diverse mobile communication systems, such as 3GPP LTE, LTE-A, and IEEE 802.

What is claimed is:

1. A method of transmitting a signal at a femtocell base station (BS) using scheduling information in a mobile communication system having a hierarchical cell structure, the method comprising:

receiving first scheduling information from a macrocell BS via an $N^{th}$ subframe, the first scheduling information including information related to a first resource allocated to the femtocell BS;

transmitting second scheduling information to one or more femtocell user equipments (UEs) served by the femtocell BS via an $N+M^{th}$ subframe, the second scheduling information related to a second resource allocated to the UEs from among the first resource; and transmitting data to or receiving data from the UEs using the second resource in one or more subframes sequentially starting from an $N+K^{th}$ subframe, wherein N, M and K are integers, wherein K is greater than M, wherein K is determined based on a time interval between an uplink grant and an uplink transmission in the mobile communication system, and wherein the first scheduling information further includes information related to whether the first resource is consecutively available during a predetermined duration or the first resource is periodically available according to a predetermined period.

2. The method of claim 1, further comprising:
transmitting a signal to the macrocell BS to request resource allocation.

3. The method of claim 1, wherein the first scheduling information further includes information indicating that the first resource is to be allocated to the one or more UEs for the one or more subframes.

4. The method of claim 3, wherein the one or more subframes correspond to the predetermined duration or the predetermined period.

5. The method of claim 1, wherein the first scheduling information is received via an R-PDCCH (Relay-Physical Downlink Control CHannel) that is a channel for transmitting control information for a relay station, higher layer signaling or a backhaul.

6. The method of claim 1, wherein, K is 4.

7. The method of claim 1, wherein the first scheduling information is received via a semi-persistent scheduling signal when the first resource is periodically available according to the predetermined period.

8. The femtocell base station of claim 1, wherein the transmission module is further configured to transmit a signal to the macrocell BS to request resource allocation.

9. A femtocell base station (BS) for transmitting a signal using scheduling information in a mobile communication system having a hierarchical cell structure, the BS comprising:

a reception module configured to receive first scheduling information from a macrocell BS via an $N^{th}$ subframe, the first scheduling information including information related to a first resource allocated to the femtocell BS;

a transmission module configured to transmit second scheduling information to one or more femtocell user equipments (UEs) served by the femtocell BS via a $N+M^{th}$ subframe, the second scheduling information including information related to a second resource allocated to the UEs from among the first resource; and a processor configured to control the reception module to receive data from and the transmission module to transmit data to the UEs using the second resource in one or more subframes sequentially starting from an $N+K^{th}$ subframe, wherein N, M and K are integers, wherein K is greater than M, wherein K is determined based on a time interval between an uplink grant and an uplink transmission in the mobile communication system, and wherein the first scheduling information further includes information related to whether the first resource is consecutively available during a predetermined duration or the first resource is periodically available according to a predetermined period.

10. The femtocell base station of claim 9, wherein the first scheduling information further includes information indicating that the first resource is to be allocated to the one or more UEs for the one or more subframes.

11. The femtocell base station of claim 9, wherein the one or more subframes correspond to the predetermined duration or the predetermined period.

12. The femtocell base station of claim 9, wherein the first scheduling information is received via an R-PDCCH (Relay-Physical Downlink Control CHannel) that is a channel for transmitting control information for a relay station, higher layer signaling or a backhaul.

13. The femtocell base station of claim 9, wherein K is 4.

14. The femtocell base station of claim 9, wherein the first scheduling information is received via a semi-persistent scheduling signal when the first resource is periodically available according to the predetermined period.

* * * * *